United States Patent
Lee et al.

(10) Patent No.: US 7,089,313 B2
(45) Date of Patent: Aug. 8, 2006

(54) PROTOCOL INDEPENDENT COMMUNICATION SYSTEM FOR MOBILE DEVICES

(75) Inventors: Kuo Chu Lee, Princeton Junction, NJ (US); Juan Yu, Cranbury, NJ (US); Hasan Timucin Ozdemir, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 769 days.

(21) Appl. No.: 10/205,596

(22) Filed: Jul. 25, 2002

(65) Prior Publication Data

US 2004/0019683 A1     Jan. 29, 2004

(51) Int. Cl.
    *G06F 15/16*    (2006.01)
(52) U.S. Cl. .................. 709/227; 709/220; 709/230; 370/310; 370/338
(58) Field of Classification Search ................ 709/227, 709/220, 230; 455/450, 451, 145; 370/310, 370/338
See application file for complete search history.

(56) References Cited

U.S. PATENT DOCUMENTS

| | | | | |
|---|---|---|---|---|
| 5,412,375 A | * | 5/1995 | Wood | 455/451 |
| 5,970,059 A | * | 10/1999 | Ahopelto et al. | 370/338 |
| 6,169,893 B1 | * | 1/2001 | Shaheen et al. | 455/466 |
| 6,535,493 B1 | * | 3/2003 | Lee et al. | 370/338 |
| 6,801,777 B1 | * | 10/2004 | Rusch | 455/450 |

* cited by examiner

*Primary Examiner*—Abdullahi Salad
*Assistant Examiner*—Ramy M. Osman
(74) *Attorney, Agent, or Firm*—Harness, Dickey & Pierce, PLC

(57) ABSTRACT

A system and method provides protocol independent communication between mobile electronic devices. Multiple users may communicate using different applications running on different mobile electronic devices with different end-to-end protocols. A multimedia controller in connection with control agents provides the information to establish communications between mobile electronic devices having applications with incompatible communication protocols. A session and routing controller controls communication sessions and a Web hyperlink dictionary provides information regarding the location of the multimedia controller and control agents.

42 Claims, 6 Drawing Sheets

PROTOCOL INDEPENDENT COMMUNICATION SYSTEM FOR MOBILE DEVICES

FIELD OF THE INVENTION

The present invention relates generally to mobile electronic devices, and more particularly to providing protocol independent communication between mobile electronic devices.

BACKGROUND OF THE INVENTION

In our fast paced mobile society, the need to provide communication between different electronic devices, for example, laptop computers while in transit, has increased greatly. The different types of mobile devices now available, which may each use different communication applications with proprietary protocols, has added further complexity to providing communication between these devices. From transmitting data to providing communication using audio and visual interfaces, present devices must operate within different environments having different protocol requirements, while using different communication applications installed within these devices.

In order to communicate between devices using different communication applications having incompatible protocols, drivers or other interfaces typically must be provided to allow connectivity between the devices. Thus, an interface (e.g., a driver or plug-in module) is usually required and must be loaded or installed into one or both of the devices to provide communication. As a result, a specific driver or program may have to be installed into a device for a one-time event. Not only is extra time required to install the necessary components, but additional storage space is required. Further, there always exists a risk that the newly installed components will conflict with an already installed application or are otherwise incompatible with the operating system, further complicating the communication process. Increased cost and complexity thereby result from the incompatible communication protocols required by different applications.

Thus, there exists a need to manage communication between multiple electronic devices using different applications, each of which may require a different communication protocol.

SUMMARY OF THE INVENTION

The present invention provides a system and method for providing protocol independent communication between mobile electronic devices using different communication applications. Generally, the invention provides a new operating system and method for electronic devices (e.g., Internet configured devices) to communicate using multiple proprietary end-to-end protocols, and having programmable security, privacy, routing and usage sensitive operation, which are customizable to individual users. The invention provides for the dynamic customization and selection of remote communication interfaces for users to communicate over mobile electronic devices using multiple applications.

With the present invention, multiple parties may communicate using different types of applications running on different mobile electronic devices having different end-to-end protocols. For example, party A can talk to party B by directly loading a remote speaker driver required by party A's mobile electronic device onto party B's mobile electronic device, and vice versa. The communication protocol used by the remote speaker driver is not known for a particular application; thus, a rich set of functions is provided and preferably customized for each user without the need for a complex standardization process. Further, the signals can be compressed or non-compressed. Thus, multiple parties communicating electronically are not required to use the same communication protocol.

Dynamic distribution of an access control agent to a mobile communication controller is provided using known Web processes. A visiting agent is created that communicates with a multimedia controller without limiting the communication to a predefined protocol. Selection of the application program for communication is provided when a mobile device requires a control agent. Application selection is thereby independent of a particular protocol. The communication channels may use multiple types of protocols and different types of services. A more flexible system is provided that does not require the use of a predefined single protocol (e.g., H.323) for each communication session (e.g., for each call).

Specifically, dynamic downloading of a host agent to discover the capabilities of a multimedia controller within a mobile electronic device that access the applications within the mobile electronic device is provided. Thereafter, localized visiting agents are created using predetermined service rules. The localized visiting agent provides for customized generation of access privilege and capabilities using user controllable rules. For example, a customized secure short message box (SMB) can be created in a Personal Digital Assistant (PDA) device with a limited number of users having access to the dynamically generated visiting agent, which is preferably provided and located in a Web hyperlink dictionary. Thus, there is no need to determine the type of application or protocol to use to access the SMB. Preferably, a user may dynamically control the availability of a device and security level.

A session and routing controller supports the mobility of the visiting agent and host agent. One mobile electronic device can thereby communicate with other mobile electronic devices using the visiting agent and host agent. Downloading of a host agent supports a membership subscription function, which may be implemented for use in business-to-business transactions.

The system and method preferably supports multiple session and silent monitoring, as well as conference operations. The system and method also provides for automated agents that interact with other devices and log messages.

Use of multiple applications is supported by the present invention using the multimedia controller (i.e., dynamically added to the multimedia controllers) and may be provided in a Web-based system. For example, a voice recognition (VR) function may be implemented in a mobile electronic device. The new capability can be controlled by a set of multimedia controller modules. The capability may be registered in a users' home page using the hosting agent and visiting agent. Mobile users can then obtain the required host agent and visiting agent, and run the required components on new mobile electronic devices. Thereafter, the visiting agent can record the user voice input and activate the VR function in the remote mobile electronic device. Thus, for example, using a single voice command, a Web multimedia call may be negotiated and established with a desired media type and proper security and privacy control over the Web.

The present invention allows users to utilize any new application capabilities available to establish communication connections dynamically. The multimedia controller may be stored in any location accessible electronically, via, for example, the Web, with the user's multimedia controller located using the Web hyperlink dictionary. The multimedia controller can dynamically identify new communication capabilities (i.e., new communication applications and interfaces) in order to determine compatible communication protocols. For example, the multimedia controller may identify the most recent version of a video chat application for use in communication.

Thus, using executable agents adapted for downloading into mobile electronic devices, a protocol independent system and method for communicating between mobile electronic devices is provided. Multiple mobile electronic devices may communicate using different applications having different end-to-end protocols.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein may be described in connection with specific mobile electronic devices using particular applications on a specific operating platform, it is not so limited, and the present invention may be provided in connection with different mobile devices running applications on different operating platforms.

Figure 1:
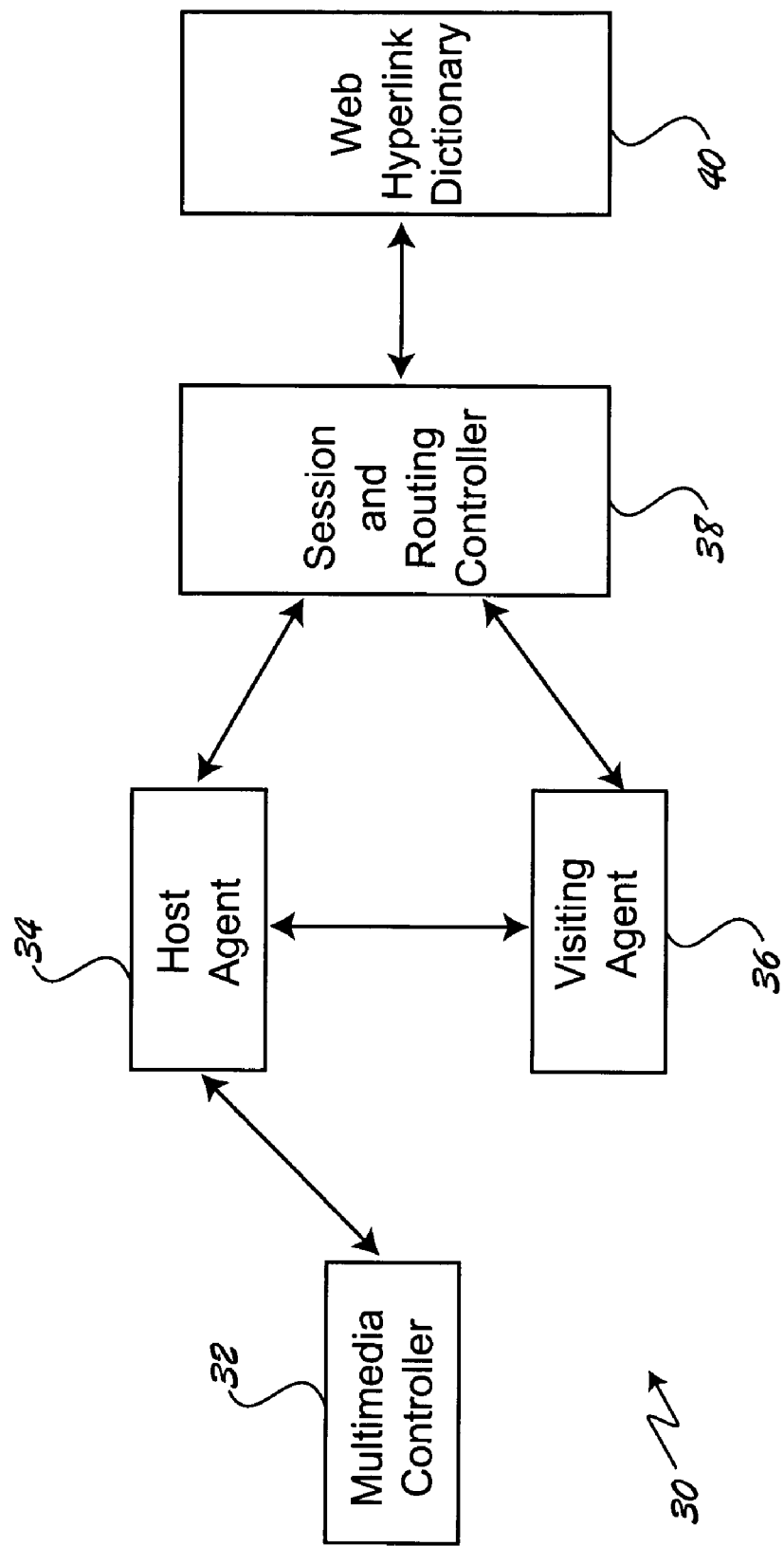
FIG. 1 is a simplified block diagram of a protocol independent communication system constructed according to the principles of the present invention.

A system and method for providing protocol independent communication between mobile electronic devices according to the principles of the present invention is shown in FIG. 1 and indicated by reference numeral 30. Generally, the system 30 includes a multimedia controller 32, agents interfacing with the multimedia controller, including a host agent 34 and a visiting agent 36, a session and routing controller 38 and a Web hyperlink dictionary 40. It should be noted that more than one of each of these components may be provided in connection with a single mobile electronic device 42.

Specifically, the multimedia controller (MC) 32 preferably comprises a software module including a set of control modules for implementing an access interface to a set of Internet devices (i.e., Internet applications), such as, for example, Web camera, Web Speaker, instant message box, media processing converters, display windows and telephone terminals, to name only a few. The MC 32 preferably uses Extensible Markup Language (XML) to define the capabilities of specific mobile electronic devices in which the MC 32 is resident. MC is the device controller that is statically installed or embedded in the mobile devices. It is not loaded dynamically and has a static interface that can be discovered by the hosting agent that is dynamically loaded to the mobile device. XML is also used to define an operation interface which in combination with the XML definition of the MC 32, provides the information needed to allow external software (hosting agent that is dynamically loaded to the mobile device) to control the mobile electronic device 42. For example, the mobile device may have a MC that controls a camera. The MC shall provide a set of XML messages that allow for the control of focus and direction of the camera and a method to encode the video transmission. A hosting agent will contain software that can discover the XML and generate a HTTP or other type of access control interface that is based on the user's preference. The hosting agent is software that has functions that are customized by the mobile user and who may not be the owner of the mobile device. The MC 32 may be implemented in connection with any mobile electronic device 42 adapted for electronic communication, and more particularly, for Web-based communication, including laptop computers, PDAs and telephone terminals. MC is the base for the hosting agent to provide a customized software layer for the mobile agent over the mobile device. Therefore, it allows a new type communication protocol to be created dynamically based on the mobile user profile that comes with the hosting agent of the mobile user. It is important to note that the hosting agent is private to the mobile user rather than the mobile device that the user is using.

The executable agents (i.e. host agent 34 and visiting agent 36) provide management functions for controlling communication sessions. Specifically, the communication protocol between the hosting agent and the visiting agent can be proprietary or standard. It can be unit directional or bi-directional, totally decided by the hosting and visiting agent of the mobile user. The host agent (MC_HA) 34 is a software management module that is adapted to be dynamically loaded into a mobile electronic device 42 and capable of accessing the MC 32 of the particular mobile electronic device 42. The host agent 34 determines the capabilities (i.e., installed communication applications, etc.) of the mobile electronic device 42 via the MC 32 and dynamically generates a visiting agent 36 to support remote operation of the capabilities via the MC 32. It should be noted that the MC_HA 34 is mobile in that it may be dynamically created or downloaded to new mobile electronic devices 42 upon, for example, a service subscription.

The visiting agent (MC_VA) 36 is a software module adapted to be loaded into a mobile electronic device 42 (e.g., a mobile electronic device 42 requesting communication with another mobile electronic device 42). The MC_VA 36 provides access to the MC 32 under the control of an associated MC_HA 34. Remote operation is monitored and controlled by the session and routing controller (SRC) 38, which is preferably also implemented as a module.

The SRC 38 uses the Web hyperlink dictionary 40 to determine (i.e., look up) the location of the MC 32 and associated agents. The SRC 38 also provides the necessary functions to control session establishment and routing operations. Use of the SRC 38 to manage the MC_VA 36 and MC_HA 34 provides functions, such as, authentication, privacy, billing, service mediation, as well as others, which cannot be provided by the users involved in the communication.

The Web hyperlink dictionary (WHD) 40 contains information about the MCs 32 and information about the agents (i.e., MC_HA 34 and MC_VA 36). In the WHD, the locations of MC agents are defined in XML. The XML definition contains the unique name of the MC and location of the MC in URL format. It also contains the security checking information to authenticate the downloading of the hosting agent. The size and runtime requirement of the agent is specified in XML. For example, it can be a thread or a process. It can be a program that needs to be installed before execution, or as dynamically runnable modules that can run in the local machine but with code stored in a remote machine (like, NFS). The WHD keeps the cache of the agent URL and program pages in the memory to improve the performance of remote execution of hosting agent. The user specific profile is also stored as URL that can be retrieved only by the authenticated hosting agent. The hosting agent is protected from MC in that it will not reveal its data to the MC or the mobile device. The execution can be performed assuming that only the XML of the MC is exposed to the hosting agent and all the rest of the resources are supported by the computing resources in the network (server or the home computer of the mobile user from which the hosting agent is downloaded). The WHD 40 may also provide a distributed cache that registers the location, ownership and capability information of the MCs 32, agents, and SRC 38.

In operation, and as shown in FIGS. 2 through 6, users can download an MC_HA 34 in a known manner to a particular mobile electronic device 42 capable of executing the MC_HA 34. For example, the MC_HA 34 may be loaded into a laptop computer from a service providers' Website or from a user's home page as described herein. The MC_HA 34 then creates an execution environment for the MC_VA 36. The execution environment includes an allocated storage area, communication channels, input output descriptors, and security control for remote access. This environment is needed for the visiting agent software to communicate with the hosting agent. This way, when the visiting agent is loaded to a mobile device, it can communicate with the execution environment created by the hosting agent. By creating an execution environment for the visiting agents, the visiting agent software can be written without the knowledge of the MC that the hosting agent is located. The hosting agent software can be written to discover capability of MC without the knowledge of the mobile device under the control of MC. Such layers of independency, ensure that both hosting and visiting agent can be written in portable code and can migrate from location to location freely. Furthermore, the privacy of mobile users is ensured by the fact that the hosting agent and visiting agent of the user communicate using a private protocol which is not known by MC of the mobile device. The upgrade of the hosting agent and visiting agent is independent from the MC and therefore, the mobile device. When a user (e.g., a caller) with the MC_HA 34 wants to connect to other users (e.g., callers), the WHD 40 is accessed and searched by the MC_HA 34 to identify the location of the MC_VA 36 needed for communication with a particular application, and downloaded from the location specified in the WHD 40 to the MC_HA 34. The MC_VA 36 and MC_HA 34 preferably begin a capability matching operation with the MCs in both devices to determine the needed components (e.g., drivers) in order to establish a communication path. The communication path is not necessarily a full connection in the conventional communication network where caller and callee use a symmetric communication medium. Each communication party (user) holds a mobile device. In the mobile device there are two possibilities: 1) with a VA of the other party; and 2) without the VA of the other party. If the device has a VA of the other party, the VA will discover the capability of the MC or by locating the VA of the MC. In both cases, the objective is to get the handle to the communication capabilities. Once the VA obtains the handle to the communication capabilities, the VA can use these capabilities to deliver information. The capability matching operation is based on the following steps: Determine the MC capability set $C\{i\}i=1\ldots M$. For example, a. C1: Voice Over IP capability with address 128.2.3.5@2343 where 128.2.3.5 is an example IP address and 2343 is an office extension number.

b. C2: Video over IP capability where video is one way only and requires a RTP transport channel to plug into the MC in order to get the video stream.

c. C3: A Web page that contains the secrete key that the visiting user must get it before the MC can be used by the hosting agent of the visiting mobile user.

d. C4: a file storage area that can be used to store messages.

e. C5: Browser handle to down load more software modules to execute in the browser.

The discovery can be done in arbitrary order. The basic function is to get the capability and display it to the user.

The VA can use the capability of MC to display the capability of VA that reflects the capability of the mobile device of the other party. For example, the VA can also have C2 and C5. In that case, the C2 and C5 will be displayed to the user, and the user can use either one to communicate with the other user by simply clicking the C2 or C5.

IF VA did not find any capability that matches it own, then, VA must alert the user through a standard error message window. In that case, the user can consider to download a new hosting agent that can match the VA capability. In that case, VA needs to have the capability to provide the capability list to the mobile device.

MC of the mobile device needs to have the capability to search the WHD to find proper hosting agent based on capability to match the capability of the VA.

The WHD have the capability to cache the capability list of VA and HA so that a quick look up is possible. New capability can be leased from a third party repository which can allow expensive capability to be used temporarily.

The VA, HA and MC capability matching operation also can be based on a predetermined goal provided by the user so that automatic matching can be performed without user intervention. Such matching operation can be based on a cost function and a desire function. Weights are assigned to capability and desire. A simple algorithm can be to find a maximum capability (sum of the capability weight) that is less than the cost specified in the goal.

Figure 2:
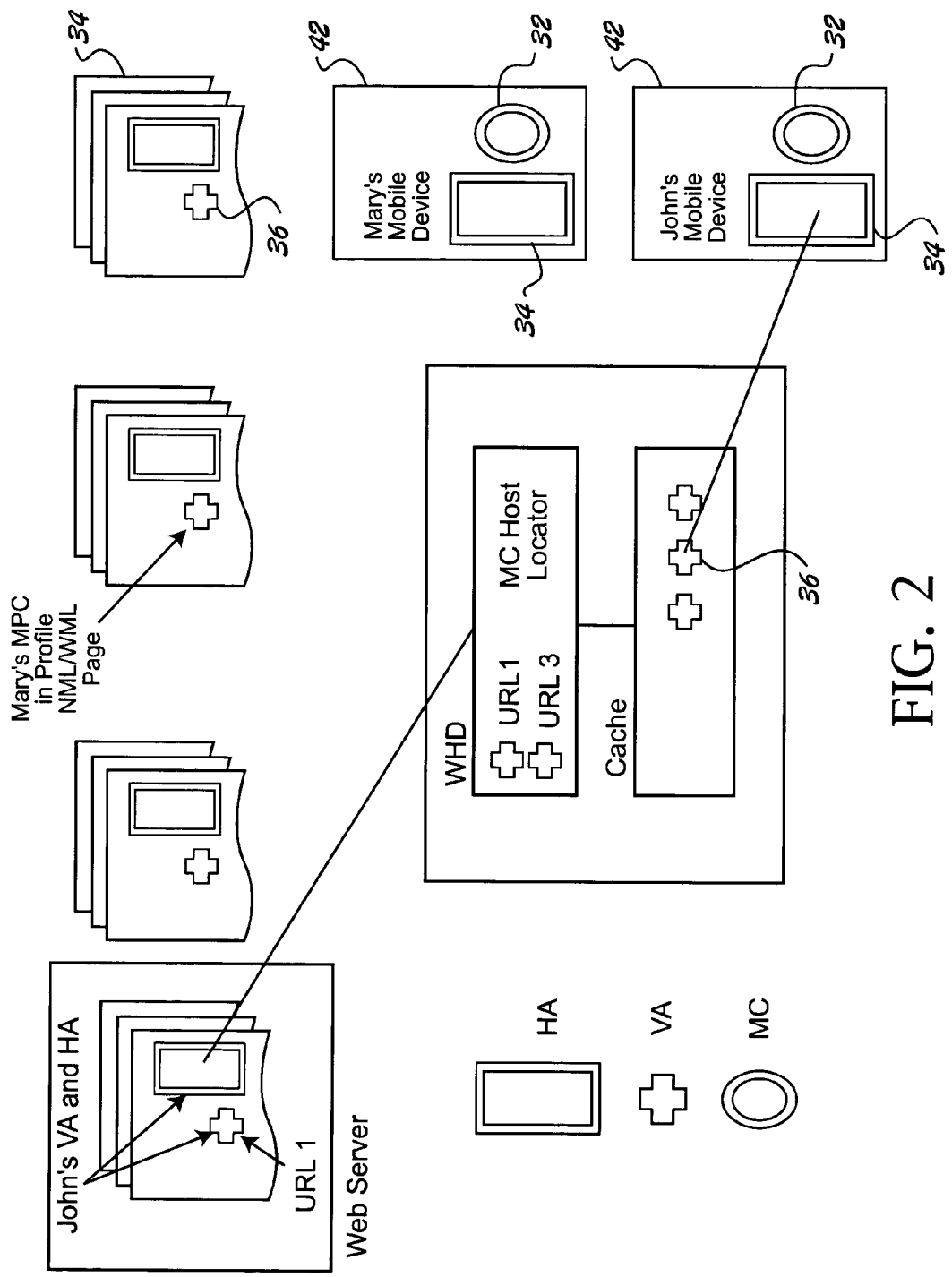
FIG. 2 is a block diagram showing loading of a host agent of the present invention into a mobile electronic device.

Referring specifically to FIG. 2, and an example of the operation of a system 30 constructed according to the principles of the present invention, two users, John and Mary want to establish a communication connection between each of their mobile electronic devices 42. As shown therein, John downloads the MC_HA 34 (e.g., remotely from the Internet) and the MC_HA 34 determines the capabilities (e.g., available communication applications and required protocols) of John's mobile electronic device 42 by interfacing with the MC 32 of John's mobile electronic device 42. An example of a capability interface for the MC 32 is shown below in XML format:

An example MC Capability file in XML format:

```
<description ID="MultimediaController">
    <type resource="#CapabilityInterface"/>
    <type resource="#SWRDescriptions"/>
</description>
<description ID="CapabilityInterface">
    <method name="getSRD">
        <output name="" type="ArrayOfSWR"/>
    </method>
    <method name="getSwDescription">
        <input name="SwDName" type="string"/>
        <output name="return" type="SWRD"/>
    </method>
</description>
<description ID="SWRDescriptions">
    <resource name="speaker" resource="#Speaker"/>
    <resource name="camera" resource="#Camera"/>
</description>
<swrd name="Speaker">
    <ControlInterface resource="#SpeakerControl"/>
    <InputInterface resource="#SpeakerInput"/>
    <OutputInterface resource="#SpekerOutput"/>
</swrd>
<description ID="SpeakerControl">
    <method name="setVolume">
        <input name="volume" type="int"/>
    </method>
    <method name="getVolume">
        <output name="return" type="int"/>
    </method>
</description>
<description ID="SpeakerInput">
    <mtype codec="G.711" protocol="RTP" tprotocol="UDP"/>
    <mtype codec="G.723" protocol="RTP" tprotocol="UDP"/>
</description>
<description ID="SpeakerOutput">
    <mtype codec="G.711" protocol="RTP" tprotocol="UDP"/>
    <mtype codec="G.723" protocol="RTP" tprotocol="UDP"/>
</description>
<swrd name="Camera">
    <ControlInterface resource="#CameraControl"/>
    <InputInterface resource="#CameraInput"/>
    <OutputInterface resource="#CameraOutput"/>
</swrd>
<description ID="CameraControl">
    <method name="start">
        <output name="return" type="boolean"/>
    </method>
    <method name="stop">
        <output name="return" type="boolean"/>
    </method>
    <method name="zoom_in">
        <input name="value" type="float"/>
    </method>
    <method name="zoom_out">
        <input name="value" type="float"/>
    </method>
</description>
<description ID="CameraInput">
    <mtype codec="H.261" protocol="RTP" tprotocol="UDP"/>
    <mtype codec="H.263" protocol="RTP" tprotocol="UDP"/>
</description>
<description ID="CameraOutput">
    <mtype codec="H.261" protocol="RTP" tprotocol="UDP"/>
    <mtype codec="H.263" protocol="RTP" tprotocol="UDP"/>
</description>
```

As shown in this example of a capability interface XML file, the capability interface within the MC 32 provides the necessary information to control the physical device drivers within John's mobile electronic device 42.

After a discovery phase (i.e., determining the communication capabilities and requirements of John's mobile electronic device 42 via the MC 32), the MC_HA 34 generates a localized version (e.g., on John's mobile electronic device 42) of the MC_VA 36. The MC_VA 36 contains information regarding the applications within John's mobile electronic device 42, including, for example, the specific available service applications (e.g., chat, H.323 video, media recording, remote Web Cam operation, short message box, etc.), access rights, and a set of user names that can access the service applications. Other information may be provided as needed. In operation, the MC_VA 36 provides the interface for a remote user to communicate with the downloaded MC_HA 34 to access the MC 32 of the mobile device 42. The electronic address of the MC_VA 36 is preferably transmitted to the WHD 40 for use in future connections to the particular mobile electronic device 42 (i.e., in order to determine the location of the MC_VA 36).

Figure 3:
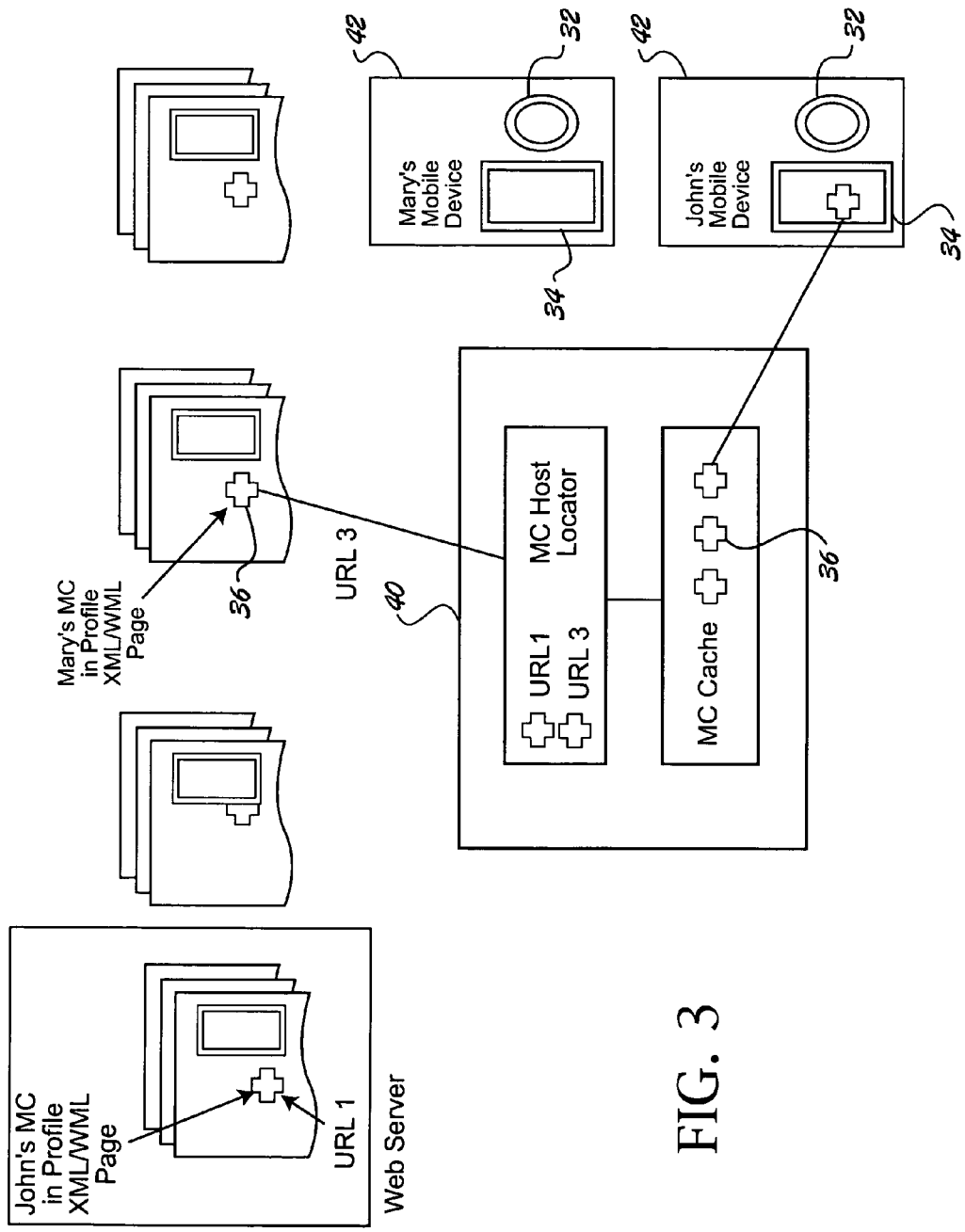
FIG. 3 is a block diagram showing loading of a visiting agent of the present invention into a mobile electronic device.
Figure 4:
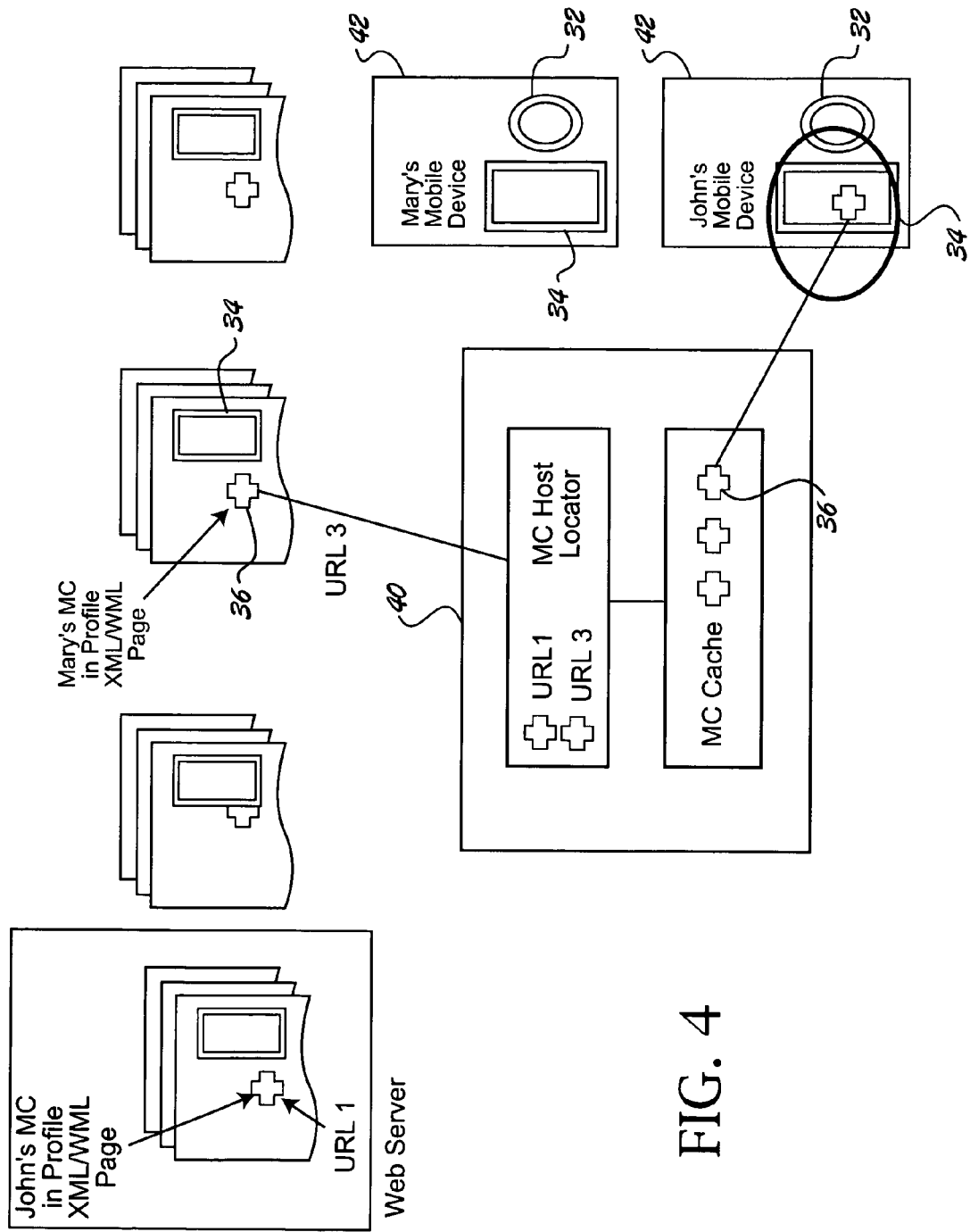
FIG. 4 is a block diagram showing service negotiation between a host agent and visiting agent of the present invention.

With respect to establishing a communication session between mobile electronic devices 42, as shown in FIG. 3, the MC_VA 36 is loaded onto a mobile electronic device 42 requesting a communication session, and provides the necessary information for the mobile electronic devices 42 to communicate. Specifically, and as shown in FIG. 3, John wants to communicate with Mary, and is provided with Mary's MC_VA 36, such as, for example, by downloading Mary's MC_VA 36 into John's mobile electronic device 42. The location of Mary's MC_VA 36 is determined using the WHD 40. The downloading of Mary's MC_VA 36 allows John's mobile electronic device 42 to obtain the needed communication capabilities to communicate with Mary's mobile electronic device 42 through hosting agent in Mary's device. Preferably, and as shown in FIG. 4, upon obtaining Mary's MC_VA 36, John's MC 32 determines the capabilities of Mary's MC 32 (i.e., accesses Mary's capability interface XML file). John's mobile electronic device 42 may be required to request permission to access the information regarding Mary's MC 32. In operation, the following procedure (i.e., service negotiation process) is preferably performed using Service Logic Program to obtain access to another mobile electronic device 42: A service logic program consist of a dynamically upgradable set of scripts and function components that have access to the capability of agents. The Service Logic Program can be executed just like a simple program in the execution environment provided by the hosting agent.

(1) Check MC 32 access permission;
(2) Check MC 32 application capability and availability;
(3) Check user status; and
(4) Grant execution permission.

Figure 5:
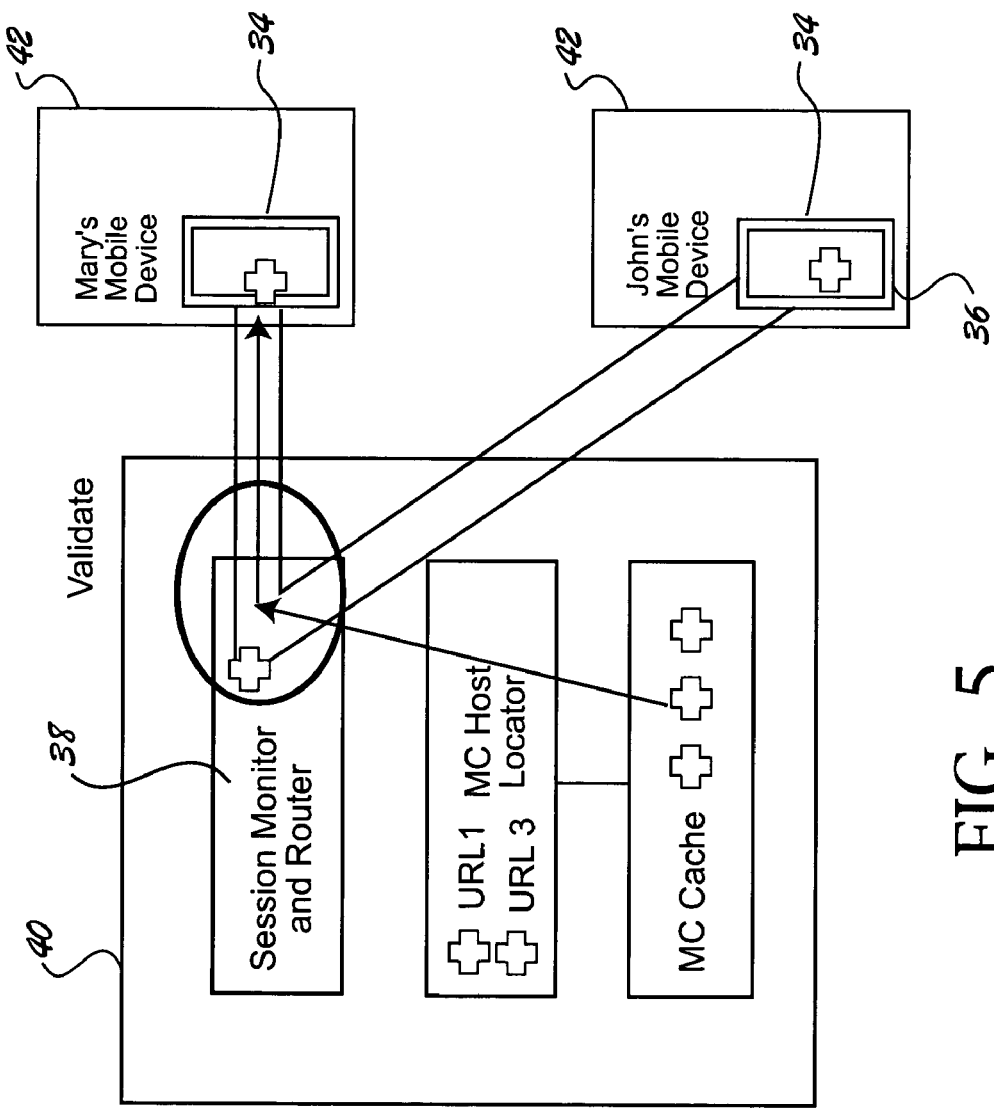
FIG. 5 is a block diagram showing loading of the necessary components into a mobile electronic device to provide protocol independent communication according to the present invention.

Upon completion of this service negotiation process, John's mobile electronic device 42 has obtained the necessary communication information needed to establish a connection using the appropriate application in Mary's mobile electronic device 42. The application within Mary's mobile electronic device 42 is then initiated under the control of the SRC 38. As shown in FIG. 5, Mary's mobile electronic device 42 may also obtain services from John's mobile device 42 (i.e., use applications in John's mobile electronic device 42) by requesting John's MC_VA 36 using the WHD 40. It should be noted that the applications residing on John's mobile electronic device 42 and the applications residing on Mary's mobile electronic device 42 may or may not be different, and may have different communication protocol requirements. For example, Mary's mobile electronic device 42 may include a specific chat application not available on John's mobile electronic device 42.

Figure 6:
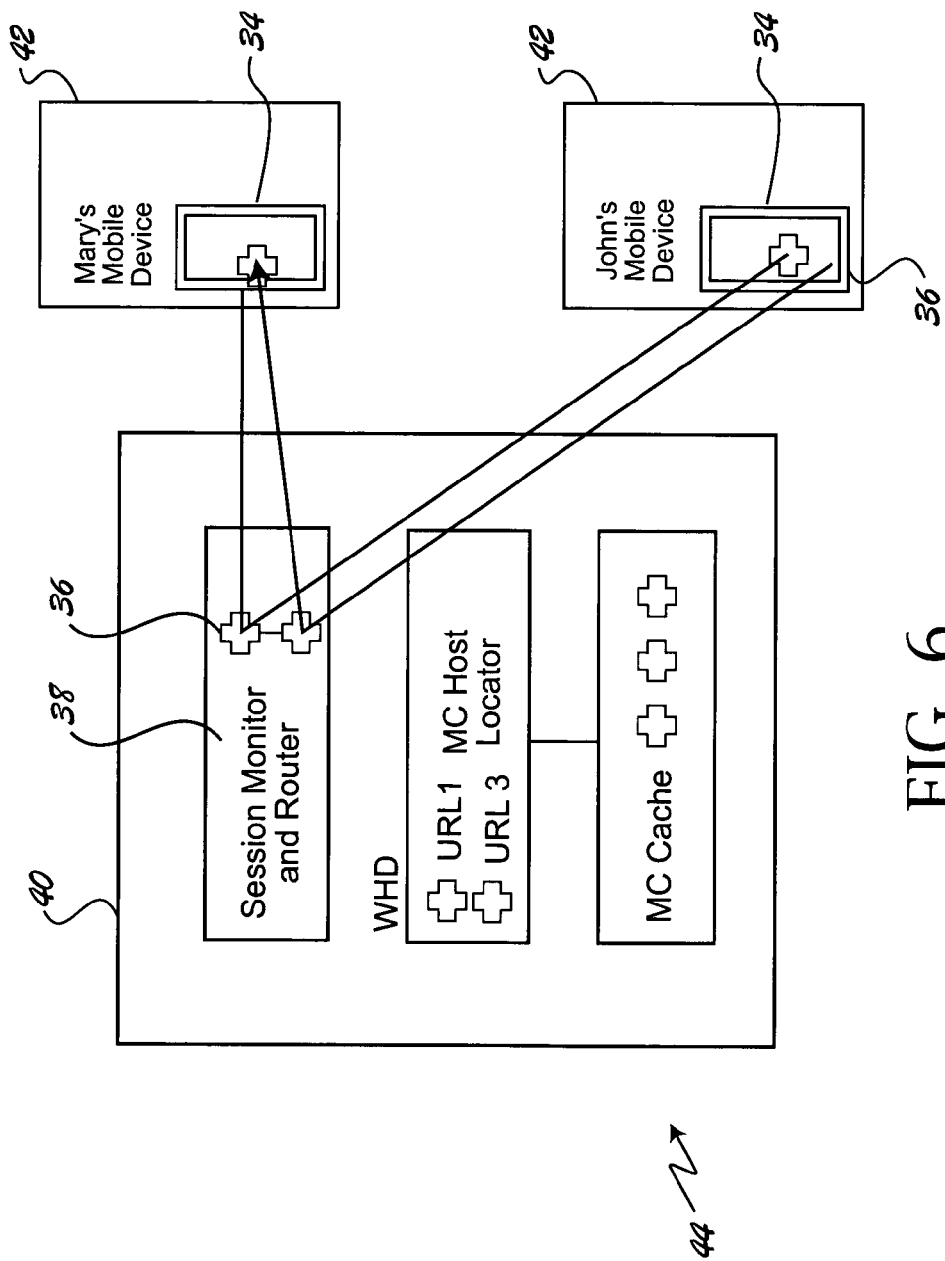
FIG. 6 is a block diagram showing different applications running on different mobile electronic devices providing protocol independent communication according to the present invention.

Thus, in operation, two loosely coupled communication applications requiring different communication protocols are connected and running between two different mobile electronic devices 42 as shown in FIG. 6. As shown, Mary's mobile electronic device 42 may use John's private message box and John's mobile electronic device 42 may use Mary's video services. It should be noted that the connection may be bi-directional to support silent monitoring and announcement. For example, the SRC 38 may block a video stream transmitted to John's mobile electronic device 42.

The components of the present invention may be provided as part of a server 44. The server 44 is independent from the mobile electronic devices 42 and may provide additional functions, such as, for example, the blocking of communication. A call session recording capability also may be provided and shared by multiple users of the server 44.

In a more preferred embodiment, the system 30 allows a user to communicate with a predetermined set of other users (e.g., friends) through the Internet. The system 30 may be provided as a "community center" that enables users to communicate with each other electronically (e.g., on the Internet) via various communication channels (e.g., voice, video, and text) and message formats. The server 44 implementing the system 30 provides capabilities for managing and automating the searching and negotiation of the communication applications to be used, such as, for example, phone calls from either PSTN or IP, Instant Message, email, video, or Present Service or Call Processing Server.

Specifically, the system may require users to first subscribe to a server 44 having the system 30 provided therewith to become a member of a particular community. The system 30 creates a user profile for each subscribed user and saves the profiles to the WHD 40. The profiles as shown below in XML format set forth the capabilities of the mobile electronic devices 42 that the users can access, and the status (e.g., busy) of the mobile electronic devices 42.

(1) User Profile XML File:
```
<?xml version="1.0"?>
<!DOCTYPE UserObject SYSTEM
http://10.1.10.67/whddir/dtd/UserObject.dtd">
<UserObject>
<userID>100</userID>
<userStatuts>Active</userStatus>
<password>100100</password>
<setOfRoleObject>
<RoleObjectVector>
<Role>Regular</Role>
</RoleObjectVector>
</setOfRoleObejct>
<setOfAddressObejct>
<AddressObjectVector>
<Address>100</Address>
</AddressObjectVector>
<AddreeObjectVector>
<Address>9190100</Address>
</AddressObjectVector>
</setOfAddressObject>
<setOfUANObject>
<UAN>1019</UAN>
</UANObjectVector>
</setOfUANObject>
<setOfGroupObject>
</setOfGroupObject>
</UserObject>
```
(2) Device Capability and Status XML File:

-continued
```
<?xml version="1.0"?>
<!DOCTYPE TerminalObject SYSTEM
http://10.1.10.67/whddir/dtd/TerminalObject.dtd">
<TerminalObject>
<terminalID>102</terminalID>
<terminalType>RGW</terminalType>
<status>Active</status>
<UANID>1003</UANID>
<mediaType>H323_TSP<mediaType>
<RASAddress>34.0.0.90:1027</RASAddress>
<CallSignalAddress>34.0.0.90:1026</CallSignalAddress.
<TerminalObject>
```

In operation, when a user logs on to the system 30, the system 30 will provide a notification to other subscribed users of the same community preferably through Presence Service. Presence service is used instant messaging service to provide indication of whether a user has logged into the system and ready to receive messages. When a user wants to establish a communication session with another member, the member's XML profile file will be accessed using the WHD 40 to determine the mobile electronic devices 42 the user may use based upon the profile as described herein. If the system 30 identifies a mobile electronic device 42 that user can use, a call-processing server of the system 30 establishes a connection among the users. After a connection is initiated, the status of the mobile electronic devices 42 through which the users are connected will be modified to indicate availability, and the system 30 preferably automatically notifies this to other community members through Present Service.

Users may provide a hyperlink to the system 30 (i.e., the community site) to their Web Home Page. Users can then use their MC 32 remotely via the Internet. Thus, users can remotely access their MC 32 through their home page either to establish communication or to modify their MC 32 profile to reflect a different communication environment (i.e., using a different mobile electronic device 42 while in transit). Thus, communication may be provided remotely from different locations using different mobile electronic devices 42. An example of an XML file for changing a user profile (e.g., while in transit) is shown below:

```
<?xml version ="1.0"?>
<!DOCTYPE entity SYSTEM
'http://localhost/whddir/slp/dtd/Entity.dtd'>
<entity id="routeByTimeOfWeek"
xmlns:xlink="http//www.w3.org/1999/xlink">
<schema idref="RouteByTimeOfWeekSchema"
xlink:href="/slp/schema/RouteByTimeOfWeekSchema.xml"/>
<property name="unhandleLink" value="acceptCallOn106"/>
<property name="errorLink" value="slp_engine_stop"/>
<property name="branch1" value="acceptCallOn106"/>
<property name="branch2" value="acceptCallOn107"/>
<property name="branch3" value="acceptCallOn108"/>
<property name="timetable"
value="Monday,9:30;Thursday,23:00;2|Thursday,18:01;Friday,9:30;
1|Friday,9:31;Friday,23:30;3"/>
</entity>
```

Thus, the present invention provides for mobile users to download the MC 32, locate an SRC server, and communicate with others that are using mobile electronic devices 42 that may have incompatible communication protocols. With the system 30, no dialing or use of other manual searching operations is needed. Users may have multiple connections and sessions during one communication, with the capabilities of any mobile electronic device 42 made available by the MC_VA 36. User identities also may be hidden from each other. Further, communications may be monitored or encrypted in any direction using any media or device. The present invention provides an interface that combines the various communication needs of a user into one platform and allows a user to access other users' applications to communicate peer to peer without requiring the same communication protocol.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of communicating between devices independently of a specific communication protocol, the devices having applications for communicating using different protocols with specific communication requirements, the method comprising the steps of:

determining one or more communication capabilities for applications of a specific device and providing a uniform controller for the capabilities using a multimedia controller;

loading a hosting agent to discover and utilize a capability of the multimedia controller to create an execution environment for visiting agents;

creating an executable visiting agent for the hosting agent on top of the multimedia controller within the specific device adapted for communicating the determined communication capability provided through the hosting agent to the multimedia controller of the specific device to provide an arbitrary protocol for communication between the visiting agent and the hosting agent, wherein such protocol is between the visiting agent and the hosting agent which is independent from a protocol defined in a capability list of the multimedia controller; and down-loading and executing the executable agent upon a request to a requesting device to thereby provide protocol independent communication between the requesting device and the specific device, wherein the multimedia controller includes control modules for implementing one or more access interfaces to a set of devices and uses metadata to provide: (a) a definition of one or more capabilities of the devices in which the media controller is resident; and (b) an operation interface which, in combination with the definition, provides information to allow the hosting agent to control the devices, wherein the execution environment created by the hosting agent for the visiting agent includes an allocated storage area, communication channels, input output descriptors, and security control for remote access, thereby ensuring that the visiting agent can communicate with the execution environment created by the hosting agent and thereby control the devices without needing to have any knowledge of the media controller, wherein the hosting agent is operable to discover capabilities of the media controller without requiring any knowledge of the devices under the control of the media controller, wherein privacy of a user of at least one of the devices is ensured by a capability of the hosting agent and visiting agent of the user to communicate using a private protocol which is not known by the media controller, wherein communication sessions between the visiting agent and the hosting agent are controlled and monitored by a session and route control module to enable dynamic selection of a path and monitoring of unidirectional or bidirectional communications between one of more visiting agents and host agents, wherein the visiting agent can use any protocol to communicate with the hosting agent to support a variety of communication methods between different types of devices without requiring the different types of devices to use identical, symmetrical multimedia communication protocols to communicate with each other.

2. The method according to claim 1 further comprising restricting access to the executable agent to a predetermined set of users.

3. The method according to claim 1 further comprising storing the location of the executable agent for use in subsequent communications.

4. The method according to claim 1 wherein communication is provided via the Internet and further comprising configuring the executable agent for access using the Internet.

5. The method according to claim 1 further comprising creating a profile to identify the communication capabilities for the applications of the specific device and the capability has weights for supporting automatic capability matching based on cost functions, wherein the cost functions can be changed by users using one or more service logic programs which can be dynamically created by users or system administrators.

6. The method according to claim 5 wherein the step of creating a profile further comprises creating a different profile for each mobile electronic device of a user.

7. The method according to claim 1 further comprising transmitting the executable agent to the requesting device.

8. A method of communicating between mobile electronic devices independent of a specific communication protocol, the mobile electronic devices having applications using different protocols with specific communication requirements, the method comprising the steps of:

accessing a first mobile electronic device from a second mobile electronic device; and transmitting from the first mobile electronic device to the second mobile electronic device an agent adapted for automatically communicating the specific communication requirements of the first mobile electronic device for use in providing protocol independent communication between the first and second mobile electronic devices, wherein a multimedia controller of at least one of the devices includes control modules for implementing one or more access interfaces of at least one of the devices and uses metadata to provide: (a) a definition of one or more capabilities of at least one device in which the media controller is resident; and (b) an operation interface which, in combination with the definition, provides information to allow a hosting agent to control the device in which the media controller is resident, wherein an execution environment created by the hosting agent for a visiting agent includes an allocated storage area, communication channels, input output descriptors, and security control for remote access, thereby ensuring that the visiting agent can communicate with the execution environment created by the hosting agent and thereby control the device in which the media controller is resident without needing to have any knowledge of the media controller, wherein the hosting agent is operable to discover capabilities of the media controller without requiring any knowledge of the device under the control of the media controller, and wherein privacy of a user of at least one of the devices is ensured by a capability of the hosting agent and visiting agent of the user to communicate using a private protocol which is not known by the media controller, and communication between the hosting agent and the visiting agent occurs indirectly via a session and route control module.

9. The method according to claim 8 wherein the step of accessing a first mobile electronic device further comprises requesting permission to access the first mobile electronic device.

10. The method according to claim 8 further comprising determining the location of the agent using a web hyper link dictionary which provides one or more indexes to agents and profiles that are distributed over the Web.

11. The method according to claim 10 wherein the communication is Internet based and further comprising linking to the location of the agent using a hyperlink Web dictionary.

12. The method according to claim 8 further comprising accessing a multimedia controller to determine the communication capabilities of the first mobile electronic device.

13. A method of communicating between mobile electronic devices independent of a common communication protocol, the mobile electronic devices having applications for communicating using different protocols with specific communication capabilities, the method comprising the steps of:

using an agent within a first mobile electronic device to identify the specific communication requirements for at least one of the applications of the first mobile device, the agent adapted for transmitting the communication requirements to a second mobile electronic device requesting communication with the first mobile electronic device; and providing portions of the agent to the second mobile electronic device, the agent configured to automatically communicate the communication capability for the at least one application to provide communication with the first mobile electronic device independent of communication protocol, wherein a multimedia controller of at least one of the devices includes control modules for implementing one or more access interfaces of at least one of the devices and uses metadata to provide: (a) a definition of one or more capabilities of at least one device in which the media controller is resident; and (b) an operation interface which, in combination with the definition, provides information to allow a hosting agent to control the device in which the media controller is resident, wherein an execution environment created by the hosting agent for a visiting agent includes an allocated storage area, communication channels, input output descriptors, and security control for remote access, thereby ensuring that the visiting agent can communicate with the execution environment created by the hosting agent and thereby control the device in which the media controller is resident without needing to have any knowledge of the media controller, wherein the hosting agent is operable to discover capabilities of the media controller without requiring any knowledge of the device under the control of the media controller, and wherein privacy of a user of at least one of the devices is ensured by a capability of the hosting agent and visiting agent of the user to communicate using a private protocol which is not known by the media controller.

14. The method according to claim 13 wherein the step of providing portions further comprises duplicating the portions of the agent within the second mobile electronic device.

15. The method according to claim 13 further comprising accessing an Internet implemented database to determine the location of the agent.

16. The method according to claim 13 further comprising accessing a sever to identify other mobile electronic devices having agents.

17. A method of communicating between two different application programs running on first and second machines using different end-to-end protocols, the method comprising the steps of:

loading a host agent into the first machine which determines the capability of a multimedia controller on the first machine and creates a visiting agent to support the remote operation of the multimedia controller; and loading the visiting agent into the second machine which operates in response to applications on the second machine to control the multimedia controller on the first machine via the hosting agent on the first machine, wherein the multimedia controller includes control modules for implementing one or more access interfaces of the first machine and uses metadata to provide: (a) a definition of one or more capabilities of the first machine; and (b) an operation interface which, in combination with the definition, provides information to allow the hosting agent to control the first machine, wherein an execution environment created by the hosting agent for the visiting agent includes an allocated storage area, communication channels, input output descriptors, and security control for remote access, thereby ensuring that the visiting agent can communicate with the execution environment created by the hosting agent and thereby control the first machine without needing to have any knowledge of the media controller, wherein the hosting agent is operable to discover capabilities of the media controller without requiring any knowledge of the first machine, and wherein privacy of a user of at least one of the machines is ensured by a capability of the hosting agent and visiting agent of the user to communicate using a private protocol which is not known by the media controller.

18. The method according to claim 17 further comprising storing the location of the host agent in an Internet based database.

19. The method according to claim 17 further comprising requesting the visiting agent before loading the visiting agent into the second machine.

20. The method according to claim 19 further comprising limiting access to the visiting agent to a predetermined set of users.

21. A method of operating components of a first machine that are controlled by a multimedia controller on the first machine with a second machine running a different application and end-to-end protocols than the first machine, the method comprising the steps of:

loading into the second machine a visiting agent that was created by a host agent on the first machine that assessed the capabilities of the multimedia controller on the first machine, the visiting agent permitting applications on the second machine to control components on the first machine via the host agent that created the visiting agent, wherein the multimedia controller includes control modules for implementing one or more access interfaces of the first machine and uses metadata to provide: (a) a definition of one or more capabilities of the first machine; and (b) an operation interface which, in combination with the definition, provides information to allow the hosting agent to control the first machine, wherein an execution environment created by the hosting agent for the visiting agent includes an allocated storage area, communication channels, input output descriptors, and security control for remote access, thereby ensuring that the visiting agent can communicate with the execution environment created by the hosting agent and thereby control the first machine without needing to have any knowledge of the media controller, wherein the hosting agent is operable to discover capabilities of the media controller without requiring any knowledge of the first machine, and wherein privacy of a user of at least one of the machines is ensured by a capability of the hosting agent and visiting agent of the user to communicate using a private protocol which is not known by the media controller.

22. The method according to claim 21 further comprising limiting the set of machines into which the visiting agent is loaded.

23. The method according to claim 22 further comprising requesting the visiting agent and wherein loading is only provided to the limited set of machines.

24. The method according to claim 21 further comprising remotely loading the host agent into the first machine.

25. The method according to claim 21 wherein the first and second machines are adapted for Internet communication and further comprising storing the Internet address of the visiting agent in an Internet database.

26. The method according to claim 25 further comprising accessing the database to determine the location of the visiting agent to load into the second machine.

27. A method of providing communication between mobile devices operating different applications with interfaces having different protocols, the method comprising the steps of:
providing a host agent within a first mobile device to identify a set of modules provided by a multimedia controller of the first mobile device for use in communication:
creating a visiting agent within the first mobile device associated with the host agent for accessing the multimedia controller of the first mobile device;
using a session and routing controller to access a hyperlink dictionary and to identify available modules of the set of modules of the multimedia controller of the first mobile device; and
providing the visiting agent to a second mobile device to allow communication between the first and second mobile devices independently of a specific protocol,
wherein the multimedia controller includes control modules for implementing one or more access interfaces of the first device and uses metadata to provide: (a) a definition of one or more capabilities of the first device in which the media controller is resident; and (b) an operation interface which, in combination with the definition, provides information to allow the hosting agent to control the first device, wherein an execution environment created by the hosting agent for the visiting agent includes an allocated storage area, communication channels, input output descriptors, and security control for remote access, thereby ensuring that the visiting agent can communicate with the execution environment created by the hosting agent and thereby control the first device without needing to have any knowledge of the media controller, wherein the hosting agent is operable to discover capabilities of the media controller without requiring any knowledge of the first device under the control of the media controller, and wherein privacy of a user of at least one of the devices is ensured by a capability of the hosting agent and visiting agent of the user to communicate using a private protocol which is not known by the media controller.

28. The method according to claim 27 wherein the step of providing the visiting agent further comprises loading the visiting into the second mobile device.

29. The method according to claim 27 wherein the step of using the session and routing controller further comprises limiting access to the multimedia controller to a predetermined set of users.

30. A mobile device adapted for protocol independent electronic communication, the mobile device comprising:
a storage unit having a plurality of applications requiring different protocols for use in communication; and
a processor programmed to control the operation of the applications and wherein a host agent associated with a multimedia controller under the control of the processor assesses the protocol requirements of the plurality of applications and creates a visiting agent for loading into other mobile devices to provide protocol independent communication
wherein the multimedia controller of the device includes control modules for implementing one or more access interfaces of the devices and uses metadata to provide: (a) a definition of one or more capabilities of the device; and (b) an operation interface which, in combination with the definition, provides information to allow the host agent to control the device,
wherein an execution environment created by the host agent for the visiting agent includes an allocated storage area, communication channels, input output descriptors, and security control for remote access, thereby ensuring that the visiting agent can communicate with the execution environment created by the host agent and thereby control the device without needing to have any knowledge of the media controller,
wherein the host agent is operable to discover capabilities of the media controller without requiring any knowledge of the device, and
wherein privacy of a user of at least one of the device or the other devices is ensured by a capability of the host agent and visiting agent of the user to communicate using a private protocol which is not known by the media controller.

31. The mobile device according to claim 30 wherein the host and visiting agents are provided in an Internet based format and further comprising an interface for accessing the host and visiting agents.

32. In a communication system controlling a plurality of mobile electronic devices, a method of communicating between the mobile electronic devices with different applications having different communication protocols comprises the steps of:

selecting a specific mobile electronic device with which to communicate via an application of the specific mobile electronic device; and obtaining from the specific mobile electronic device a visiting agent configured for automatically communicating information for use in operating the application within the specific mobile electronic device to provide protocol independent communication, wherein a multimedia controller of the specific mobile electronic device includes control modules for implementing one or more access interfaces of the specific mobile electronic device and uses metadata to provide: (a) a definition of one or more capabilities of the specific mobile electronic device; and (b) an operation interface which, in combination with the definition, provides information to allow a hosting agent to control the specific mobile electronic device, wherein an execution environment created by the hosting agent for the visiting agent includes an allocated storage area, communication channels, input output descriptors, and security control for remote access, thereby ensuring that the visiting agent can communicate with the execution environment created by the hosting agent and thereby control the specific mobile electronic device without needing to have any knowledge of the media controller, wherein the hosting agent is operable to discover capabilities of the media controller without requiring any knowledge of the device under the control of the media controller, and wherein privacy of a user is ensured by a capability of the hosting agent and visiting agent of the user to communicate using a private protocol which is not known by the media controller.

33. The method according to claim 32 further comprising using a host agent of the specific mobile electronic device in connection with the visiting agent to control the application of the specific mobile electronic device to thereby provide protocol independent communication.

34. The method according to claim 32 further comprising using pairs of visiting and hosting agents.

35. The method of claim 34 wherein a unidirectional channel is applicable for silent monitoring of a conversation from a third party.

36. The method of claim 32 further comprising, loading of at least one visiting agent from any location to support home agent monitoring of at least two conversations between multiple parties dynamically using different media.

37. The method of claim 36 wherein said media are selected from the group consisting of voice telephony communication, video communication, internet chat communication and combinations thereof.

38. The method of claim 32 further comprising using multiple protocols among multiple parties.

39. The method of claim 32 further comprising using multiple protocols among multiple parties by loading multiple agents using different communication capabilities.

40. The method of claim 39 wherein said different communication capabilities are selected from the group consisting of voice, video, chat; word processor, email and combinations thereof.

41. The method of claim 32 wherein said communication is supported by communication among mobile devices.

42. The method of claim 32 wherein said communication is supported by direct communication among devices.

\* \* \* \* \*